Sept. 13, 1932.  G. H. MERRILL  1,876,720
METHOD OF MAKING PROTECTING MEANS FOR CONNECTING DEVICES
Filed Sept. 11, 1930
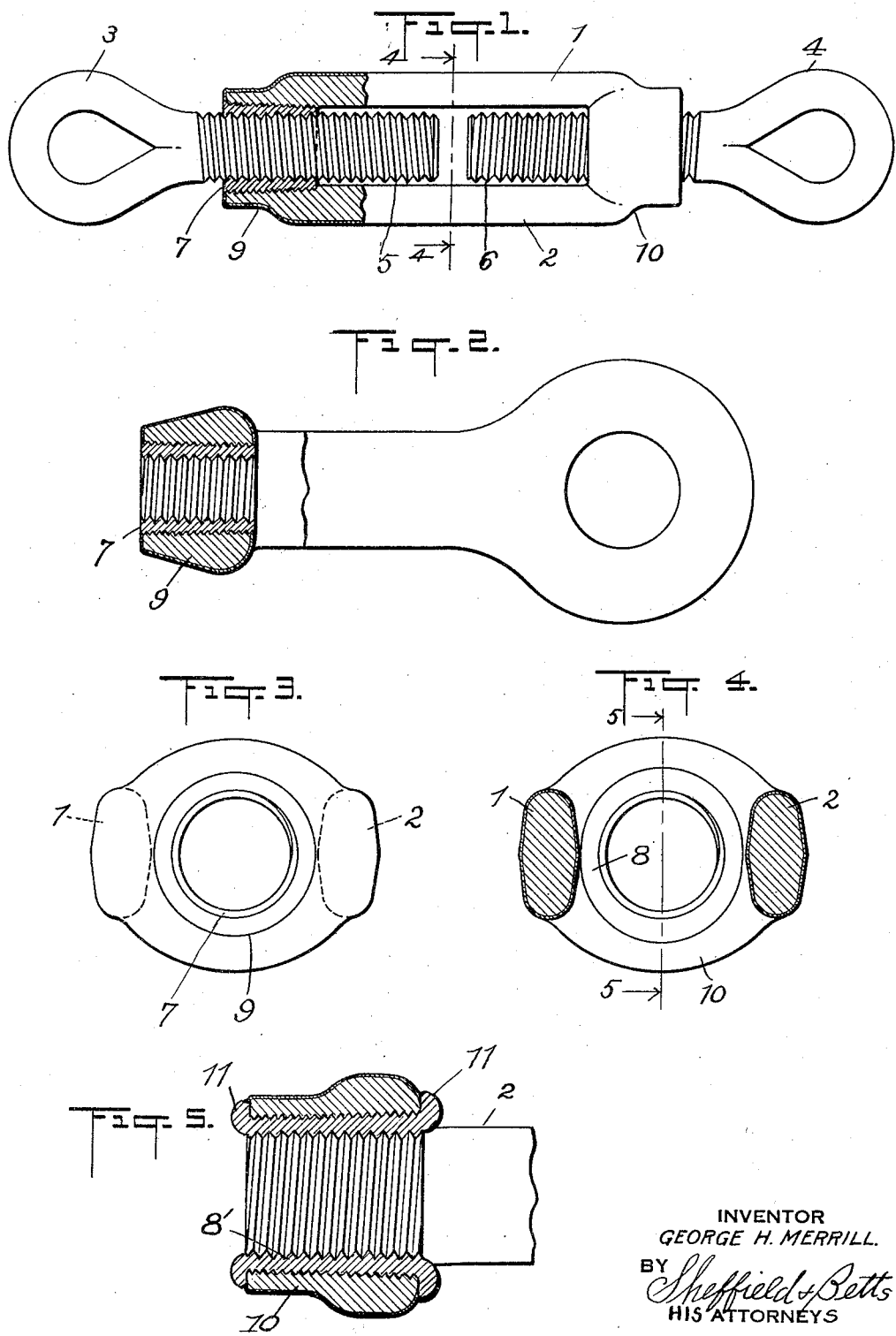
INVENTOR
GEORGE H. MERRILL.
BY Sheffield & Betts
HIS ATTORNEYS Patented Sept. 13, 1932

1,876,720

UNITED STATES PATENT OFFICE

GEORGE H. MERRILL, OF FOREST HILLS, NEW YORK

METHOD OF MAKING PROTECTING MEANS FOR CONNECTING DEVICES

Application filed September 11, 1930. Serial No. 481,330.

This invention relates in general to means for protecting connecting devices from rust, corrosion and similar action due to the effects of moisture, gases and outdoor weather conditions. Such devices include turn buckles, clevises and similar screw threaded joints which are usually employed in exposed locations such as on shipboard, in constructing electric railway overhead structures, derrick towers, bridges and similar frame work.

Heretofore when it has been desired to protect articles such as turn buckles from the action of the weather when located in exposed positions it has been customary to treat such articles so as to give them a coating of non-corrodible material such as by galvanization. It will be appreciated, however, that in galvanizing the parts of a turn buckle, before assembling, the external surfaces are much more easily galvanized than the internal surfaces and when internal screw threads have been necessary it has been practically impossible to galvanize such screw threads without greatly interfering with the shape of the threads and the size of the opening in which the threads are placed. Furthermore galvanized or soft metal surfaces in contact are obviously objectionable because they produce greater friction and may even coalesce. In the case of turn buckles the interior openings in the iron or steel through which the male members of the turn buckle pass have the screw threads cut in them by suitable taps. This method of manufacturing obviously leaves the internal screw threads with exposed iron or steel surfaces and although the male screw-threaded members of the turn buckle may be galvanized, the exposed surfaces of the internal screw threads soon become rusted or corroded.

It is, therefore, the object of this invention to produce an article that will overcome this difficulty and do away with exposed internal screw threaded portions of iron or steel providing in the place thereof screw threaded portions which are not subject to rust and corrosion.

For a description of two forms of the article involved in this invention which I at present deem preferable, reference may be had to the following specification and to the accompanying drawing form a part thereof, in which Figure 1 is an elevation of a turn buckle showing one end thereof cut away to illustrate its construction; Fig. 2 is an elevation of a clevis, one end thereof being shown partly in section for the same purpose; Fig. 3 is an end view of the body portion of the turn buckle shown in Fig. 1, the screw threaded male members being removed. Fig. 4 is a sectional view taken substantially on the line 4—4 of Fig. 1 and Fig. 5 is a sectional view of a modified form taken substantially on a line corresponding to 5—5 of Fig. 4.

Referring to Fig. 1 the numerals 1 and 2 indicate the two parallel side portions of a turn buckle and the numerals 3 and 4 indicate the two screw threaded eye portions which are, as is customary, provided with right and left hand screw threads as indicated at 5 and 6. The numerals 7 and 8 indicate metallic bushings which are preferably screw-threaded into the connecting portions 9 and 10 which unite the parallel portions 1 and 2. These bushings 7 and 8 are composed of a non-corrodible and non-rustable metal such as brass, bronze or some suitable alloy of aluminum which has the necessary strength to withstand the tensions placed upon the turn buckle. These bushings are made and placed in position as follows:

The main body of the turn buckle consisting of the parallel portions 1 and 2, and the end portions 9 and 10, is first formed in the usual way by forging or casting or in any other suitable manner. The ends 9 and 10 are then bored out so as to have a diameter of the bushings 7 and 8 to be inserted therein. Screw threads are then cut upon the internal surfaces of the openings and similar screw threads are cut upon the outer surfaces of plugs or bushings forming blanks therefor. These blanks are then screwed in position within the openings passing through the ends 9 and 10 and are retained therein temporarily by friction. The ends or only a portion of the ends of the turn-buckle is then deformed by pressing or striking a sufficient number of blows to slightly bend or reshape the bushing or a portion thereof to deform it into an oval or other shape instead of remaining round. The direction of such blows are preferably at right angles to the line 5—5 in Fig. 4 so the bushing 8 is caused to assume an oval or slightly elliptical shape. This deforming of the bushing obviously prevents the same from rotating relative to the turn buckle when cutting threads or at any subsequent time when the parts of the turn buckle are adjusted. The oval shape of the bushing is clearly indicated in Fig. 4.

The whole body portion of the turn buckle may be then galvanized in the usual manner, which galvanization obviously covers the ends and interior of the bushings 7 and 8. Thereafter the central hole in the bushing which during the deformation of the bushing has also assumed an oval shape is bored out in circular form and then tapped to receive the screw threaded portions of the eye bolts or metal members which may have been previously galvanized over all portions including the screw threads.

It will be apparent that the same treatment may be adopted in manufacturing clevises similar to that shown in Fig. 2 and may also be adapted in the manufacture of any screw threaded parts where it is desired to have accurate surfaces in contact with each other without danger of the parts becoming "frozen," owing to the action of rust or corrosion.

The illustration of Fig. 5 of the drawing shows a portion of a turn-buckle in which the deforming has been omitted but the same result is accomplished by upsetting or rivetting over the ends of the internal bushing. In Fig. 5 the numeral 8' indicates the internal bronze, brass or other bushing which has been inserted in the end of the turn-buckle as above described. However, before galvanizing, if done, or before the internal threads are cut, the projecting ends of the bushing are rivetted over or expanded outward to form slightly projecting flanges as indicated at 11. This operation serves to firmly fix the bushing 8' within the screw threaded opening in the end 10, to prevent rotation under torsional strains when in use or during the cutting of internal threads.

It will be apparent in the latter modification the bushing itself is deformed from its cylindrical shape by expanding the ends of the bushing over the material of the head of the turn-buckle. In this sense the parts of the turn-buckle in both forms illustrated have been "deformed" for the same purpose, that is, to prevent rotation of the bushing.

It will be apparent that articles made in the ways above described have no surfaces particularly internal surfaces which are subject to rust or corrosion and yet the screw threaded or contacting portions of the relative movable parts are of such a nature that they may be accurately formed and will engage each other with practically the same degree of closeness that is characteristic of machined parts.

One advantage of forming the devices as above outlined is that they have practically all of the valuable characteristics of articles made out of pure brass or pure bronze, yet, are much less expensive on account of the comparatively low price of similar parts made of steel and at the same time the devices as described contain the strength due to tensile strength of forged steel.

In certain cases the galvanization of the surfaces of the turn-buckle may be omitted and instead of using steel eye or hook portions the same may be made of brass, bronze or of a nickel or other suitable alloy.

Other variations and other utilities will be apparent to those skilled in the art and I do not wish to be understood as being limited to the details of form or the details of the method of making as herein illustrated, for various changes may be made without departing from the spirit and the scope of my invention.

What I claim is new and desire to protect by Letters Patent is:—

1. The method of making a structural connecting device the main portion of which may be subject to corrosion which comprises, inserting an exteriorly finished bushing of non-corrodible metal within an accurately shaped opening in one portion thereof, treating said parts to prevent movement of said bushing applying external coatings of integral non-corrodible metal to all portions of said device, and machining the internal surface of said bushing.

2. The method of making a structural connecting device subject to corrosion which comprises, inserting a bushing of non-corrodible metal within one portion thereof, deforming said bushing under pressure, applying external coatings of integral non-corrodible metal to all portions thereof, and machining the internal surface of said bushing in accordance with the complementary portion of said device.

3. The method of making a structural connecting device subject to corrosion which comprises, inserting a bushing of non-corrodible metal within one portion thereof, deforming said bushing under pressure, applying external coatings of integral non-corrodible metal to all portions thereof, including said bushing, and then cutting screw threads in said bushing in accordance with the screw threads on the complementary portion of said device.

4. The method of making a structural connecting device subject to corrosion, which comprises, screw threading an opening in one portion thereof, inserting in said opening a screw threaded bushing of non-corrodible metal, deforming said bushing under pressure, galvanizing all portions of said device, and then cutting screw threads in said bushing in accordance with the screw threads on the complementary portion of said device.

Signed this 9th day of September, 1930.
GEORGE H. MERRILL.